US012798100B2

(12) United States Patent
Panzirsch

(10) Patent No.: US 12,798,100 B2
(45) Date of Patent: Nov. 17, 2026

(54) ACTUATOR SYSTEM

(71) Applicant: Deutsches Zentrum für Luft- und Raumfahrt e.V., Bonn (DE)

(72) Inventor: Michael Panzirsch, Wessling (DE)

(73) Assignee: Deutsches Zentrum für Luft- und Raumfahrt e.V., Bonn (DE)

( * ) Notice: Subject to any disclaimer, the term of this patent is extended or adjusted under 35 U.S.C. 154(b) by 333 days.

(21) Appl. No.: 18/421,491

(22) Filed: Jan. 24, 2024

(65) Prior Publication Data

US 2024/0246236 A1 Jul. 25, 2024

(30) Foreign Application Priority Data

Jan. 25, 2023 (DE) ..................... 10 2023 101 816.7

(51) Int. Cl.
*G05B 11/00* (2006.01)
*B25J 9/16* (2006.01)
*B25J 13/02* (2006.01)

(52) U.S. Cl.
CPC ........... *B25J 9/1689* (2013.01); *B25J 9/1633* (2013.01); *B25J 13/025* (2013.01)

(58) Field of Classification Search
CPC ...... B25J 9/1689; B25J 9/1633; B25J 13/025; G05B 2219/40146; G05B 2219/40407
See application file for complete search history.

(56) References Cited

U.S. PATENT DOCUMENTS

2012/0328395 A1* 12/2012 Jacobsen .................. B66F 9/18 414/1
2014/0195052 A1* 7/2014 Tsusaka ................. A61B 34/30 700/260
2020/0310386 A1 10/2020 Panzirsch

FOREIGN PATENT DOCUMENTS

DE 202019001448 U1 8/2020
DE 102020113409 A1 11/2020
DE 102020115294 A1 4/2021
DE 102020107612 B3 9/2021
DE 102020121561 B3 11/2021
DE 102021111413 B3 6/2022
DE 102022107130 A1 9/2022

* cited by examiner

*Primary Examiner* — Aleksey Olshannikov
(74) *Attorney, Agent, or Firm* — The Webb Law Firm

(57) ABSTRACT

An actuator system, in particular for teleactuation, including a first actuator, in particular for operation by a user, a second actuator, in particular for executing a movement of the user, a transmission channel between the first actuator and the second actuator for transmitting the velocity and/or force of the first actuator to the second actuator and vice versa, and a controller, wherein the controller is configured such that the energy of the first actuator introduced in the direction of the transmission channel and the energy of the second actuator introduced in the direction of the transmission channel can be measured by the controller as target energy, wherein the controller is configured to transmit a predefined portion of the target energy back to the first actuator as part of a reference energy, and the controller is configured to control the damping of the first actuator and/or the second actuator as a function of the transmitted reference energy.

11 Claims, 1 Drawing Sheet

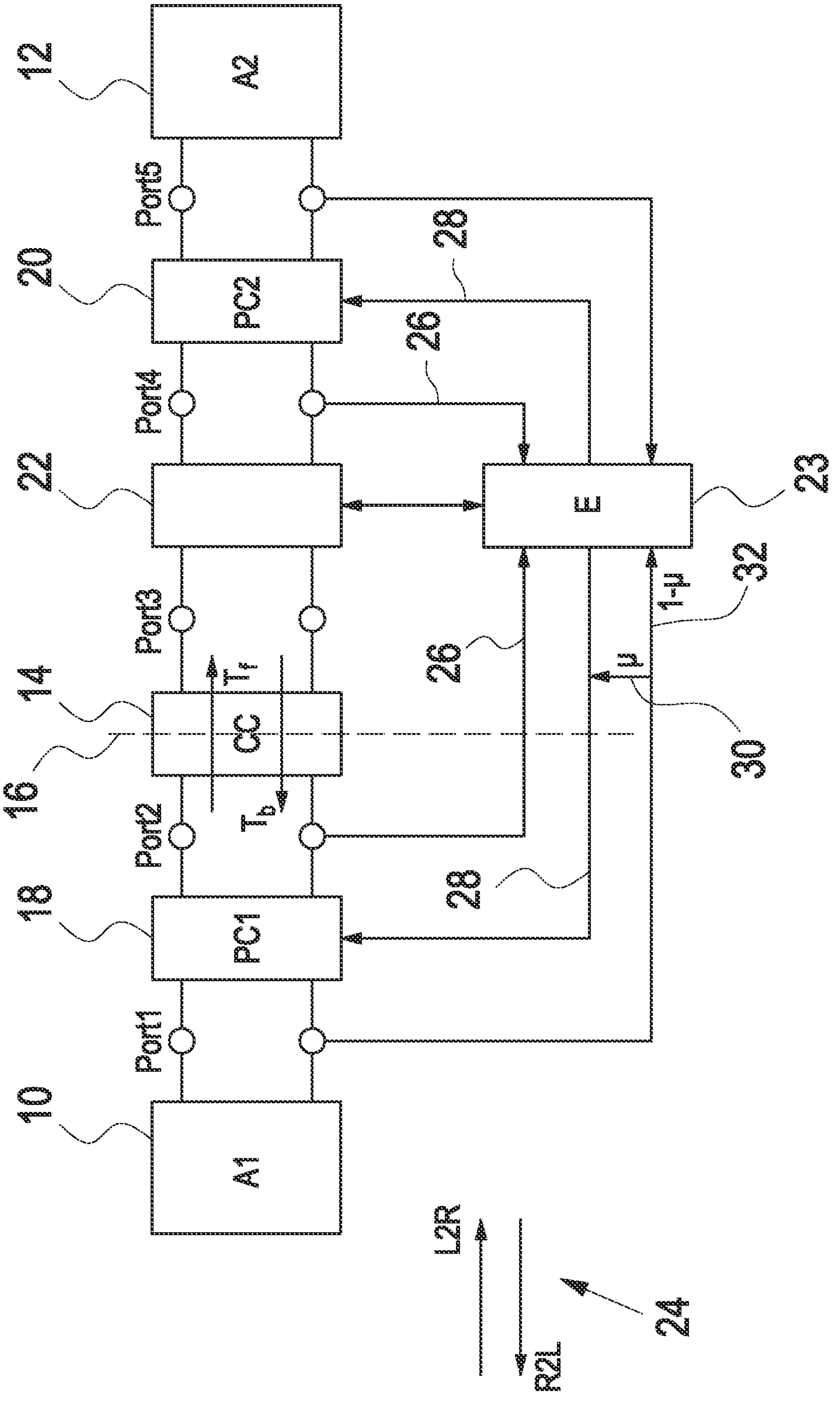
A1
A2
PC1
PC2
CC
E
Port1
Port2
Port3
Port4
Port5
$T_r$
$T_b$
μ
1-μ
L2R
R2L
10
12
14
16
18
20
22
23
24
26
26
28
28
30
32

ACTUATOR SYSTEM

CROSS REFERENCE TO RELATED APPLICATIONS

This application claims priority to German Patent Application No. 10 2023 101 816.7, filed Jan. 25, 2023, the disclosure of which is hereby incorporated by reference in its entirety.

BACKGROUND OF THE INVENTION

Field of the Invention

The present invention relates to an actuator system, in particular for teleactuation.

Description of Related Art

Coupled actuated systems consist of a first actuator connected to a second actuator via a transmission channel. Movements of the first actuator are to be transmitted to the second actuator by means of the transmission channel. The first actuator and the second actuator can be controlled in a master-slave configuration so that a movement applied to the first actuator by an operator, for example, is transmitted via the transmission channel to the actuator that executes the operator's movement. Here, the first actuator serves as a master and the second actuator as a slave. In addition to the transmission of a movement or force from a first actuator to a second actuator, force control is also to be ensured by a force feedback system, so that a force or movement is also retransmitted from the second actuator to the first actuator by means of the transmission channel. Thus, sufficient system transparency is to be provided so that the operator can be provided with sufficient information on the movement and interaction force performed by the second actuator.

However, real transmission channels have a certain latency or a time delay. This time delay may lead to an instability of the system. To maintain the passivity or stability of the actuator system, respectively, a controller is provided in the approach known from DE 202019001448 U1 as the energy-reflection-based Time Domain Passivity Approach (TDPA-ER). The controller comprises a first passivity controller damping the first actuator. Furthermore, a second passivity controller is provided, which performs damping on the second actuator. Furthermore, a position controller is provided, which controls a position coupling between the first actuator and the second actuator. An energy monitoring apparatus for monitoring the energies is connected to the position controller. The energy monitoring apparatus comprises an energy storage for managing the energies. According to the TDPA-ER, the energy monitoring apparatus thus records how much energy is introduced into the system via the first actuator or the second actuator. The energy available in the system, i.e. the energy introduced by the first and second actuators, is then stored in the energy storage. This energy is then distributed by the energy monitoring apparatus to the first and second passivity controllers as a reference. The first and second passivity controllers dissipate excess energy generated by delays in the communication channel, for example, by damping the energy on the side of the first and second actuators, respectively.

This ensures that no more energy leaves the system than was introduced, thus guaranteeing the stability and passivity of the actuator system at all times.

A problem with the TDPA-ER approach are the changes in direction of the energy flow. Such changes in direction of the energy flow can occur in particular during contact with the environment, for example a wall contact, when there is a transition from the phase of increasing the force transmitted from the first actuator to the second actuator to the phase of decreasing the force transmitted from the first actuator to the second actuator. If the direction of the energy flow changes on the side of the first actuator while the change of direction has not yet taken place on the side of the second actuator due to the time delay, and the first passivity controller prevents power from exiting in the direction of the first actuator, the time delay can lead to a sudden drop in force or excessive damping and thus to an impairment of the system transparency.

SUMMARY OF THE INVENTION

The object of the present invention is to provide a stable actuator system with improved position accuracy and system transparency as well as improved robustness against changes in the energy flow in the system.

The object is achieved by the actuator system as described herein.

The actuator system according to the invention, in particular for teleactuation, comprises a first actuator, in particular for operation by a user. For example, the first actuator can be a master in a master-slave configuration. Furthermore, the actuator system comprises a second actuator, in particular for executing a movement of the user. For example, the second actuator can be a slave in a master-slave configuration.

The actuator system according to the invention further comprises a transmission channel between the first actuator and the second actuator for transmitting the velocity and/or force of the first actuator to the second actuator and vice versa. Thus, the velocity and/or force of the second actuator is transmitted to the first actuator by means of the transmission channel as part of a force feedback system. This creates system transparency, whereby the user of the actuator system is preferably provided with haptic information on the movement of the second actuator.

Furthermore, a controller is provided, wherein the energy of the first actuator introduced in the direction of the transmission channel and the energy of the second actuator introduced in the direction of the transmission channel can be measured by the controller as target energy.

The controller is further configured to transmit a predefined portion of the target energy back to the first actuator as part of a reference energy.

Furthermore, the controller is configured to control the damping of the first actuator and/or the second actuator as a function of the transmitted reference energy.

In particular, this allows energy that would be transmitted to the controller to be continuously reflected back to the first actuator. Thus, energy is available earlier on the side of the first actuator, which can exit in the event of a change in direction of the energy flow at the first actuator. This allows the force reduction or damping to be adjusted depending on the situation. This optimizes system transparency and increases the robustness of the actuator system against complex energy behavior of the environment.

Preferably, the predefined portion can assume values from the interval [0, 1], particularly preferred values from the interval (0, 0.5]. This allows the energy transferred from the first actuator to the controller to be adjusted depending on the situation, wherein the passivity and stability of the actuator system is maintained at all times. In particular, the predefined portion can assume the value zero. This allows the entire energy of the first actuator measured as target energy to be transferred to the controller, in particular in the event of free movement. In particular, the predefined portion can assume the value one. This allows the entire energy transmitted from the first actuator in the direction of the controller to be reflected back to the first actuator, in particular in the event of a contact with the environment, such as an obstacle.

Preferably, the value of the predefined portion can be varied during the transmission of the target energy. This allows the size of the predefined portion to be adjusted depending on the current situation. Thus, the target energy transmitted to the controller and thus the damping of the first and/or second actuator can be adapted to the prevailing environmental conditions.

Preferably, the power $P^i$ at port i (see FIGURE) is determined according to $$P^i(k) = v^i(k)F^i(k)$$

for the sampling step k with velocity $v^i(k)$ of the actuator and the force $F^i(k)$ of the controller, wherein the energies $E^i$ are calculated as $$E^i_{L2R}(k) = T_s \sum_{j=0}^{k} P^i_{L2R}(j)$$

and $$E^i_{R2L}(k) = T_s \sum_{j=0}^{k} P^i_{R2L}(j).$$

Here, "L2R" refers to the power and energy from the first actuator to the second actuator ("left to right") and "R2L" refers to the power and energy from the second actuator to the first actuator ("right to left"). Furthermore, $T_s$ describes the sampling time.

Preferably the direction of the power flow respectively results from the sign of the power from the first actuator in the direction of the second actuator $$P^i_{L2R}(k)$$

and of the power from the second actuator in the direction of the first actuator $$P^i_{R2L}(k)$$

from:

$$P^i_{L2R}(k) = \begin{cases} 0, & \text{if } P^i(k) < 0 \\ P^i(k), & \text{if } P^i(k) > 0, \end{cases}$$

$$P^i_{R2L}(k) = \begin{cases} 0, & \text{if } P^i(k) > 0 \\ -P^i(k), & \text{if } P^i(k) < 0. \end{cases}$$

In particular, the sign of $P^i(k)$ depends on a sign convention defined in the controller.

Preferably, the controller comprises a first passivity controller damping the first actuator. Preferably, the controller comprises a second passivity controller damping the second actuator. The force of the first actuator and the second actuator is damped by the passivity controllers so that the passivity and thus the stability of the actuator system is always guaranteed.

Preferably, the controller comprises an energy monitoring apparatus, which is connected in particular to a position controller of the controller and is configured to monitor the energy flow of $$E^1_{L2R}(k) \text{ and } E^5_{R2L}(k).$$

Here, $$E^1_{L2R}(k)$$

describes the input energy flowing from the first actuator to the second actuator ("left to right") at port 1. Here, $$E^5_{R2L}(k)$$

describes the input energy flowing from the second actuator to the first actuator ("right to left") at port 5, wherein port 5 is in particular the input port of the second passivity controller. The energy $$E^*_{st}$$

stored in the energy monitoring apparatus results in $$E^*_{st}(k) = E^*_{st}(k-1) + (1-\mu)\left(E^1_{L2R}(k-T_f) - E^1_{L2R}(k-T_f-1)\right) + E^5_{R2L}(k) - E^5_{R2L}(k-1) - P^*_{R2L,des}(k-1)T_S - P^*_{L2R,des}(k-1)T_S$$

wherein $T_f$ refers to the transmission time from the first actuator to the second actuator via the transmission channel, and $$P^*_{R2L,des}(k)$$

refers to a portion of the maximum permitted exiting power in the direction from the energy monitoring apparatus to the first actuator, in particular in the direction from the second actuator to the first actuator, and $$P^*_{L2R,des}(k)$$

refers to a portion of the maximum permitted exiting power in the direction from the energy monitoring apparatus to the second actuator, in particular in the direction from the first actuator to the second actuator. In particular, the energy $$E_{st}^{*}$$

stored in the energy monitoring apparatus is potential energy of the system.

This allows the energy $$E_{st}^{*}$$

stored in the energy monitoring apparatus to be varied as a function of the predefined portion u. In particular, this can reduce a sudden reduction in the force on the first actuator when the direction of the energy flow changes.

Preferably, the current output power $$P_{out}^{act}(k)$$

of the controller results in:

$$P_{out}^{act}(k)=P_{R2L}^{3}(k)+P_{L2R}^{4}(k).$$

Preferably, the excess energy $$P_{exc}^{*}(k)$$

that leaves the controller but is not available as energy $$E_{st}^{*}$$

stored in the energy monitoring apparatus results in:

$$P_{exc}^{*}(k)=\frac{E_{st}^{*}(k)}{T_s}-P_{out}^{act}(k).$$

Preferably, the portion of the maximum permitted exiting power in the direction from the energy monitoring apparatus to the first actuator, in particular in the direction from the second actuator to the first actuator $$P_{R2L,des}^{*}(k),$$

and the portion of the maximum permitted exiting power in the direction from the energy monitoring apparatus to the second actuator, in particular in the direction from the first actuator to the second actuator $$P_{L2R,des}^{*}(k),$$

result in:

$$P_{R2L,des}^{*}(k)=\begin{cases}P_{R2L}^{3}(k)+P_{exc}^{*}\frac{P_{R2L}^{3}(k)}{P_{out}^{act}(k)}, \text{ if } \frac{E_{st}^{*}(k)}{T_s}<P_{out}^{act}(k)\\ P_{R2L}^{3}, \text{ if } \frac{E_{st}^{*}(k)}{T_s}>P_{out}^{act}(k),\end{cases}$$

and $$P_{L2R,des}^{*}(k)=\begin{cases}P_{L2R}^{4}(k)+P_{exc}^{*}\frac{P_{L2R}^{4}(k)}{P_{out}^{act}(k)}, \text{ if } \frac{E_{st}^{*}(k)}{T_s}<P_{out}^{act}(k)\\ P_{L2R}^{4}, \text{ if } \frac{E_{st}^{*}(k)}{T_s}>P_{out}^{act}(k).\end{cases}$$

Preferably, the reference energy $$E_{R2L,des}^{*}(k)$$

in the direction from the second actuator to the first actuator, for the damping on the first actuator, results in $$E_{R2L,des}^{*}(k)=E_{R2L,des}(k)+\mu E_{L2R}^{1}(k+T_f),$$

wherein $E_{R2L,des}(k)$ results from the portion of the maximum permitted exiting power in the direction from the energy monitoring apparatus to the first actuator, in particular the direction from the second actuator to the first actuator $$P_{R2L,des}^{*}(k),$$

from an integration over time.

Preferably, the value of the predefined portion is reduced during the transmission of the target energy until the energy $$E_{st}^{*}$$

stored in the energy monitoring apparatus or a deviation of a position of the first actuator and of a position of the second actuator has reached a predefined limit value. In particular, the predefined limit value can correspond to a potential energy during free movement. This allows the portion of energy reflected back to the first actuator to be reduced as long as the second actuator can follow the first actuator unhindered.

Preferably, the predefined portion (μ) is transmitted back to the first actuator before transmission via the communication channel. In particular, the value of the predefined portion (μ) is constant during the transmission of the target energy. In other words, the predefined portion, in particular if the predefined portion is constant, can already be determined on the side of the first actuator, for example at port 2, before transmission via the communication channel and can be reflected back to the first actuator, so that only the remaining portion (1−μ) of the target energy is transmitted as part of a reference energy or as an information via the communication channel in the direction of the controller.

BRIEF DESCRIPTION OF THE DRAWING

In the following, the invention is described in more detail by means of preferred embodiments with reference to the accompanying drawing.

In the Figures:

FIGURE is a schematic illustration of the actuator system in the form of a port network.

DESCRIPTION OF THE INVENTION

The FIGURE shows a first actuator 10 and a second actuator 12 connected to each other via a transmission channel 14. In particular, the first actuator and the second actuator can be a master-slave configuration. In particular, the first actuator can be a haptic input device for transmitting a movement applied by a user. In particular, the second actuator can be robot configured to execute the movement of the user. The transmission channel 14 can be a wired data transmission and a wireless data transmission. In particular, the transmission from the first actuator 10 to the second actuator 12 and vice versa can be performed via the Internet or another communication link.

A movement of the first actuator (A1) 10, which is applied by a user to the first actuator 10, for example, is then transmitted by means of the transmission channel (CC) 14 to the second actuator (A2) 12, which should then perform the same movement with a high position accuracy. Conversely, however, forces and movement acting on the second actuator 12 should also be transmitted to the first actuator 10 via the transmission channel 14, in particular as part of a force feedback system. This provides system transparency so that a user connected to the first actuator experiences forces acting on the second actuator 12 either as haptic feedback, visual feedback or the like.

As indicated in the FIGURE by the dashed line 16, the transmission channel 14 has a time delay. Here, the transmission time from the first actuator to the second actuator is $T_f$, and the transmission time from the second actuator to the first actuator is $T_b$. In particular, $T_f$ and $T_b$ can be the same, but can also be different from each other.

Due to the delay 16 of the transmission channel 14, the actuator system could become instable. A controller is provided to ensure the stability and passivity of the actuator system, respectively. The controller comprises a first passivity controller (PC1) 18 damping the first actuator 10. Furthermore, a second passivity controller (PC2) 20 is provided, which damps the second actuator 12. The force of the first actuator 10 and the second actuator 12 is damped by the passivity controllers 18, 20 so that the passivity and thus the stability of the actuator system is always guaranteed. Furthermore, a position controller 22 is provided, which controls a position coupling between the first actuator 10 and the second actuator 12.

An energy monitoring apparatus (E) 23 is connected to the position controller 22. The energy monitoring apparatus 23 is configured to monitor the energies.

The energy monitoring apparatus 23 further comprises an energy monitoring device. In particular, the energy of the system is managed by the energy monitoring device, i.e. the energy monitoring device records how much energy has been introduced via the first actuator 10 and/or the second actuator (indicated by the arrows 26 in the FIGURE) and ensures that an information on the respective maximum permitted exiting energy to the first actuator 10 and to the second actuator 12 is forwarded to the passivity controllers 18, 20 (indicated by the arrows 28 in the FIGURE) and it is then ensured by dissipation that no more energy exits, so that the passivity and thus the stability of the actuator system is always guaranteed. In the FIGURE, the energy monitoring apparatus 23 is configured as a separate element. However, the energy monitoring apparatus 23 can be an integral component of the position controller 22.

The controller 22 and in particular the energy monitoring apparatus 23 determine the power by $$P^i(k) = v^i(k)F^i(k)$$

for the sampling step k with velocity $v^i(k)$ of the actuator and the force $F^i(k)$ of the controller 22. Thus, the energies $E^i$ result in $$E^i_{L2R}(k) = T_s\sum_{j=0}^{k} P^i_{L2R}(j)$$

and $$E^i_{R2L}(k) = T_s\sum_{j=0}^{k} P^i_{R2L}(j).$$

According to the arrows 24, “L2R” refers to the power, in particular the power flow $P^i$ or the energy, in particular the energy flow $E^i$ from the first actuator 10 in the direction of the second actuator 12, and “R2L” refers to the power, in particular the power flow $P^i$ or the energy $E^i$, in particular the energy flow from the second actuator 12 in the direction of the first actuator 10. Furthermore, i refers to the respective port between the individual elements of the actuator system, so that i=1, . . . , 5. $T_s$ describes the sampling time.

However, according to the present invention, a predefined portion 30 (μ) of the energy $$E^1_{L2R}(k)$$

from the first actuator 10 in the direction of the second actuator 12 is transmitted back to the first actuator 10 as part of a reference energy, in particular as an information on the permitted exiting energy in the direction of the first actuator 10. The remaining portion 32 (1−μ) of the energy $$E^1_{L2R}(k)$$

from the first actuator 10 in the direction of the second actuator 12 is transmitted via the communication channel 14 to the energy monitoring apparatus 23, which then coordinates the energy distribution according to the energies exiting from the position controller 22 at port 3 and port 4. Preferably, the predefined portion 30 can assume a value from the interval (0, 1]. It is particularly preferred that the predefined portion 30 assumes a value from the interval (0, 0.5]. This allows the energy transmitted from the first actuator 10 to the second actuator 12 to be adjusted depending on the situation. In particular, the predefined portion 30, for example during transmission of a free movement of the first 10 to the second actuator 12, can assume the value zero. Here, the entire energy $$E^1_{L2R}(k)$$

sent by the first actuator 10 in the direction of the second actuator 12 is transmitted to the energy monitoring apparatus 23 to execute the commanded movement.

In particular, the value of the predefined portion 30 can be one. This allows the entire energy transmitted from the first actuator 10 to the controller to be reflected back to the first actuator 10, in particular in the event of contact with an obstacle, even before contact with the obstacle is released. As a result, the passivity controller 18 (PC1) needs to attenuate the force feedback of the second actuator 12 on the first actuator 10 less. This improves system transparency, in particular in the event of changes in the direction of energy flow.

In the energy monitoring device of the energy monitoring apparatus 23 the energy $$E^*_{st}(k) = E^*_{st}(k-1) + (1-\mu)\left(E^1_{L2R}(k-T_f) - E^1_{L2R}(k-T_f-1)\right) + E^5_{R2L}(k) - E^5_{R2L}(k-1) - P^*_{R2L,des}(k-1)T_S - P^*_{L2R,des}(k-1)T_S$$

is stored, wherein Tris the transmission time from the first actuator 10 to the second actuator 12. In particular, the stored energy $$E^*_{st}$$

is the potential energy of the system.

$$P^*_{R2L,des}(k)$$

is a portion, in particular the portion not directly reflected by the predefined portion 30, of the maximum permitted exiting power in the direction from the energy monitoring apparatus 23 to the first actuator, and $$P^*_{L2R,des}(k)$$

is a portion, in particular the portion not directly reflected by the predefined portion 30, of the maximum permitted exiting power in the direction from the energy monitoring apparatus 23 to the second actuator 12.

The current output power $$P^{act}_{out}(k)$$

of the controller 22 results in:

$$P^{act}_{out}(k) = P^3_{R2L}(k) + P^4_{L2R}(k).$$

The excess energy $$P^*_{exc}(k)$$

that leaves the controller 22 but, in particular if $$\frac{E^*_{st}(k)}{T_S} < P^{act}_{out}(k)$$

applies, is not available as energy $$E^*_{st}$$

stored in the energy monitoring apparatus 23 results in $$P^*_{exc}(k) = \frac{E^*_{st}(k)}{T_S} - P^{act}_{out}(k).$$

Thus, the portion of the maximum permitted exiting power in the direction from the energy monitoring apparatus 23 to the first actuator 10, in particular in the direction from the second actuator 12 to the first actuator 10

$$P^*_{R2L,des}(k),$$

and the portion of the maximum permitted exiting power in the direction from the energy monitoring apparatus 23 to the second actuator 12, in particular in the direction from the first actuator 10 to the second actuator 12

$$P^*_{L2R,des}(k),$$

result in:

$$P^*_{R2L,des}(k) = \begin{cases} P^3_{R2L}(k) + P^*_{exc}\frac{P^3_{R2L}(k)}{P^{act}_{out}(k)}, & \text{if } \frac{E^*_{st}(k)}{T_S} < P^{act}_{out}(k) \\ P^3_{R2L}, & \text{if } \frac{E^*_{st}(k)}{T_S} > P^{act}_{out}(k), \end{cases}$$

and $$P^*_{L2R,des}(k) = \begin{cases} P^4_{L2R}(k) + P^*_{exc}\frac{P^4_{L2R}(k)}{P^{act}_{out}(k)}, & \text{if } \frac{E^*_{st}(k)}{T_s} < P^{act}_{out}(k) \\ P^4_{L2R}, & \text{if } \frac{E^*_{st}(k)}{T_S} > P^{act}_{out}(k). \end{cases}$$

Here, the desired output reference energy $$E^*_{R2L}(k)$$

in the direction from the second actuator 12 to the first actuator 10, for the damping on the first actuator 10, results in $$E^{*}_{R2L,des}(k)=E_{R2L,des}(k)+\mu E^{1}_{L2R}(k+T_f),$$

wherein $E_{R2L,des}(k)$ results from the portion of the maximum permitted exiting power in the direction from the energy monitoring apparatus 23 to the first actuator 10

$$P^{*}_{R2L,des}(k)$$

from an integration over time.

The energy monitoring apparatus 23 distributes the reference energy $$E^{*}_{R2L,des}(k)$$

in the direction from the second actuator 12 to the first actuator 10 to port 1 as well as the reference energy $$E^{*}_{L2R,des}(k)$$

in the direction from the first actuator 10 to the second actuator 12 to port 5 as a reference for the respective passivity controllers 18 (PC1) and 20 (PC2). The passivity controllers 18 (PC1) and 20 (PC2) then limit the output energy according to said reference energies in order to guarantee the passivity of the system.

Preferably, the value of the predefined portion 30 is reduced during the transmission of the energy of the first actuator 10 to the second actuator 12 until the energy $E_{st}$* stored in the energy monitoring apparatus 23 has reached a predefined limit value. Alternatively or additionally, the value of the predefined portion 30 is reduced during the transmission of the energy of the first actuator 10 to the second actuator 12 until a deviation of a position of the first actuator 10 and of a position of the second actuator 12 has reached a predefined limit value. In particular, the predefined limit value can correspond to a potential energy during free movement. Thus, the predefined portion 30 of energy reflected back to the first actuator 10 can be reduced as long as the second actuator 12 can follow the first actuator 10 unhindered. In particular, the predefined portion 30 can be set to the value zero until the energy $E_{st}$* stored in the energy monitoring apparatus 23 has reached a predefined limit value, thereby ensuring that the proportionate reflection of the energy of the first actuator 10 is only carried out when an obstacle, such as a wall contact, is detected.

Preferably, the predefined portion 30 (μ) is transmitted back to the first actuator 10 before transmission via the communication channel 14. In particular, the value of the predefined portion 30 (μ) is constant during the transmission of the target energy. In other words, the predefined portion 30, in particular if the predefined portion 30 is constant, can already be determined on the side of the first actuator 10, for example at port 2, before transmission via the communication channel 14 and can be reflected to the first actuator 10, so that only the remaining portion 32 (1−μ) of the target energy is transmitted as part of a reference energy or as an information via the communication channel 14 in the direction of the controller 22.

This provides an actuator system in which the stability and passivity of the system is always guaranteed and which at the same time has improved position accuracy and system transparency as well as improved robustness against changes in the energy flow in the system.

The invention claimed is:

1. An actuator system, in particular for teleactuation, comprising:

a first actuator for operation by a user;

a second actuator for executing a movement of the user;

a transmission channel between the first actuator and the second actuator for transmitting the velocity and/or force of the first actuator to the second actuator and vice versa; and a controller, wherein the controller is configured such that the energy of the first actuator introduced in the direction of the transmission channel and the energy of the second actuator introduced in the direction of the transmission channel can be measured by the controller as target energy, wherein the controller is configured to transmit a predefined portion (μ) of the target energy back to the first actuator as part of a reference energy, wherein the controller is configured to control the damping of the first actuator and/or the second actuator as a function of the transmitted reference energy, wherein the power $P^i$ is determined according to:

$$P^{i}(k)=v^{i}(k)F^{i}(k),$$

for the sampling step k, with velocity $v^i(k)$ of the actuator and the force $F^i(k)$ of the controller, and wherein the energies $E^i$ are calculated as:

$$E^{i}_{L2R}(k)=T_s\sum_{j=0}^{k}P^{i}_{L2R}(j)$$

and $$E^{i}_{R2L}(k)=T_s\sum_{j=0}^{k}P^{i}_{R2L}(j)$$

wherein L2R refers to the power and energy from the first actuator to the second actuator, R2L refers to the power and energy from the second actuator to the first actuator, and $T_s$ refers to the sampling time.

2. The actuator system according to claim 1, wherein the predefined portion (μ) can assume values from the interval [0, 1].

3. The actuator system according to claim 1, wherein the value of the predefined portion (μ) can be varied during the transmission of the target energy.

4. The actuator system according to claim 1, wherein the direction of the power flow respectively results from the sign of the power from the first actuator in the direction of the second actuator $$P^{i}_{L2R}(k)$$

and of the power from the second actuator in the direction of the first actuator $$P^{i}_{R2L}(k)$$

from:

$$P^{i}_{L2R}(k) = \begin{cases} 0, & \text{if } P^{i}(k) < 0 \\ P^{i}(k), & \text{if } P^{i}(k) > 0, \end{cases}$$

$$P^{i}_{R2L}(k) = \begin{cases} 0, & \text{if } P^{i}(k) > 0 \\ -P^{i}(k), & \text{if } P^{i}(k) < 0. \end{cases},$$

wherein in particular the sign of $P^{i}(k)$ depends on a sign convention defined in the controller.

5. The actuator system according to claim 1, wherein the controller comprises an energy monitoring apparatus monitoring the energy flow of $$E^{1}_{L2R}(k) \text{ and } E^{5}_{R2L}(k),$$

wherein the energy $$E^{*}_{st}$$

stored in the energy monitoring apparatus results in:

$$E^{*}_{st}(k) = E^{*}_{st}(k-1) + (1-\mu)\left(E^{1}_{L2R}(k-T_f) - E^{1}_{L2R}(k-T_f-1)\right) + E^{5}_{R2L}(k) - E^{5}_{R2L}(k-1) - P^{*}_{R2L,des}(k-1)T_S - P^{*}_{L2R,des}(k-1)T_S,$$

wherein $T_f$ refers to the transmission time from the first actuator to the second actuator via the transmission channel, and $$P^{*}_{R2L,des}(k)$$

refers to a portion of the maximum permitted exiting power in the direction from the energy monitoring apparatus to the first actuator, and $$P^{*}_{L2R,des}(k)$$

refers to a portion of the maximum permitted exiting power in the direction from the energy monitoring apparatus to the second actuator.

6. The actuator system according to claim 1, wherein the current output power $$P^{act}_{out}(k)$$

of the controller results in:

$$P^{act}_{out}(k) = P^{3}_{R2L}(k) + P^{4}_{L2R}(k),$$

and wherein the excess energy $$P^{*}_{exc}(k)$$

that leaves the controller but is not available as energy $$E^{*}_{st}$$

stored in the energy monitoring apparatus results in:

$$P^{*}_{exc}(k) = \frac{E^{*}_{st}(k)}{T_S} - P^{act}_{out}(k).$$

7. The actuator system according to claim 1, wherein the portion of the maximum permitted exiting power in the direction from the energy monitoring apparatus to the first actuator $$P^{*}_{R2L,des}(k),$$

and the portion of the maximum permitted exiting power in the direction from the energy monitoring apparatus to the second actuator $$P^{*}_{L2R,des}(k)$$

results in:

$$P^{*}_{R2L,des}(k) = \begin{cases} P^{3}_{R2L}(k) + P^{*}_{exc}\dfrac{P^{3}_{R2L}(k)}{P^{act}_{out}(k)}, & \text{if } \dfrac{E^{*}_{st}(k)}{T_S} < P^{act}_{out}(k) \\ P^{3}_{R2L}, & \text{if } \dfrac{E^{*}_{st}(k)}{T_S} > P^{act}_{out}(k), \end{cases}$$

and $$P^{*}_{L2R,des}(k) = \begin{cases} P^{4}_{L2R}(k) + P^{*}_{exc}\dfrac{P^{4}_{L2R}(k)}{P^{act}_{out}(k)}, & \text{if } \dfrac{E^{*}_{st}(k)}{T_S} < P^{act}_{out}(k) \\ P^{4}_{L2R}, & \text{if } \dfrac{E^{*}_{st}(k)}{T_S} > P^{act}_{out}(k). \end{cases}$$

8. The actuator system according to claim 1, wherein the reference energy $$E^{*}_{R2L}(k)$$

in the direction from the second actuator to the first actuator, for the damping of the first actuator, results in:

$$E^{*}_{R2L,des}(k) = E_{R2L,des}(k) + \mu E^{1}_{L2R}(k+T_f),$$

wherein $E_{R2L,des}(k)$ results from the portion of the maximum permitted exiting power in the direction from the energy monitoring apparatus to the first actuator $$P^{*}_{R2L,des}(k)$$

from an integration over time.

9. The actuator system according to claim 1, wherein the value of the predefined portion (μ) is reduced during the transmission of the target energy until a position of the first actuator and of a position of the second actuator has reached a predefined limit value.

10. The actuator system according to claim 1, wherein the predefined portion (μ) is transmitted back to the first actuator before transmission via the communication channel.

11. The actuator system according to claim 10, wherein the value of the predefined portion (μ) is constant during the transmission of the target energy.

* * * * *